March 22, 1938. L. J. LARSON 2,111,790
WELDED JOINT AND METHOD OF WELDING THE SAME
Filed March 26, 1936
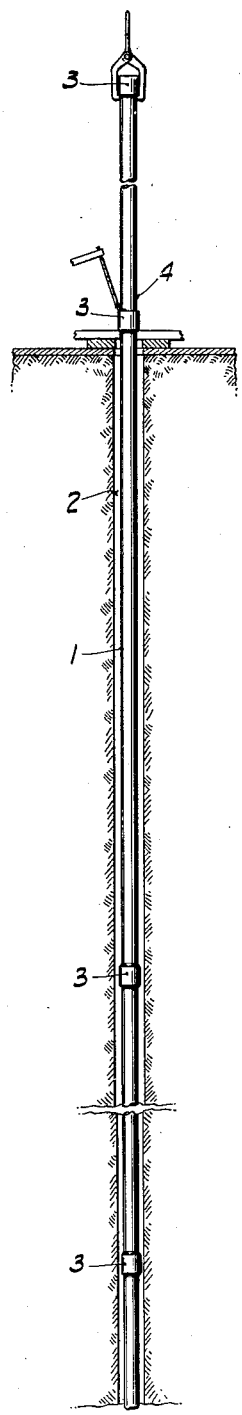
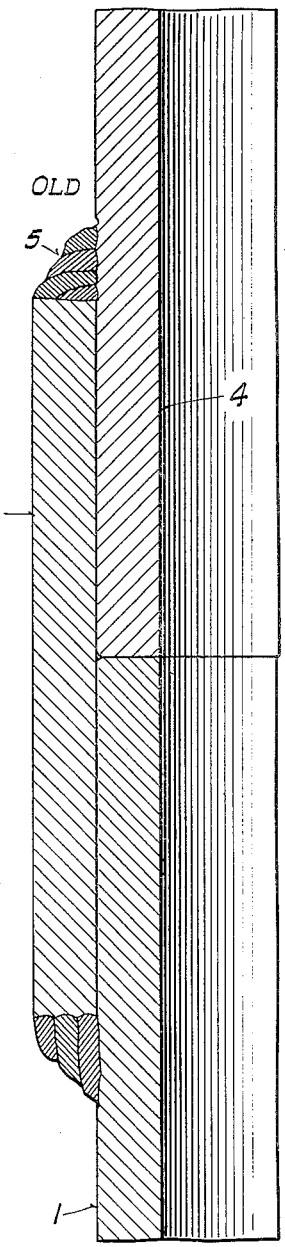
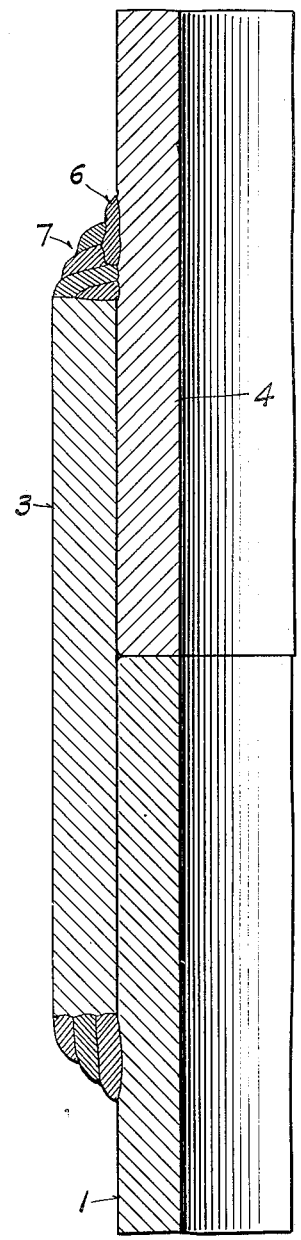
INVENTOR.
Louis J. Larson
BY
ATTORNEY.

Patented Mar. 22, 1938

2,111,790

UNITED STATES PATENT OFFICE 2,111,790

WELDED JOINT AND METHOD OF WELDING THE SAME

Louis J. Larson, Milwaukee, Wis., assignor to A. O. Smith Corporation, Milwaukee, Wis., a corporation of New York Application March 26, 1936, Serial No. 70,941

3 Claims. (Cl. 219—10)

This invention relates to a welded joint and method of welding the same and particularly welded slip joints in casing pipe.

Casing pipe for deep oil wells is generally composed of special alloy or treated steel and in some instances the heating of the metal of the casing pipe adjacent the last layer of weld metal either causes air hardening of the metal or a change in physical characteristics which weakens the overall strength of the casing for pull-out purposes.

Furthermore, in the depositing of the last layer of weld metal on the joint there may be an undercutting of the vertical wall of the casing, reducing its section and weakening it for pull-out purposes.

The object of the invention is to overcome these difficulties and to provide a casing joint of greater tensile strength and in which the strength of the casing adjacent the weld is substantially unimpaired by the welding operation.

Other objects will be apparent from the detailed description of the invention hereinafter given in connection with the accompanying drawing which illustrates an embodiment of the invention.

The views of the drawing are as follows:

Figure 1 is a view in elevation of a casing being set in a well;

Fig. 2 is a vertical section showing a completed weld of a casing under old practice; and Fig. 3 is a similar section showing a completed weld made in accordance with the present invention.

In the setting of a string of casing 1 in a well 2 the casing is lowered in convenient lengths, each length of casing being attached to the string at the top of the well before lowering. For this purpose each length of casing has secured at its upper end a slip sleeve 3 which is adapted to receive the lower end 4 of the next succeeding length of casing. The sleeve 3 and part 4 are then welded together in a vertical position at the well as shown in Fig. 1.

Referring to Fig. 2 which illustrates one of the former practices of welding, the weld 5 joins the upper horizontal end edge of sleeve 3 with the vertical outer wall of member 4. The welding is accomplished preferably by means of an electric arc using a covered metallic electrode which fuses into the joint and produces weld metal having physical properties similar to those of the casing pipe proper.

In employing an electric arc for welding a joint of this character at the well, particularly where air hardening steel is used for the casing, the steel of the casing immediately adjacent the layer being deposited is heated to such a degree that upon cooling it has a tendency to become less ductile and to have different physical characteristics from the metal of the remainder of the casing pipe. As the next layer of weld metal is deposited the previously affected steel is annealed and much of its ductility is restored. However, the last layer of weld metal has a tendency to leave a hardened zone of metal immediately adjacent it in the vertical wall of the member 4 which may reduce the resistance of the casing to fracture at this point under stress.

Furthermore, the stress is naturally concentrated at the upper edge of the weld during pull-out or setting of the casing due to the rather abrupt change in section at this point. Any chance undercutting of the vertical wall of member 4 may additionally weaken the joint at the point of concentrated stress.

Fig. 3 illustrates the method of the present invention for greatly improving the characteristics of the joint. In carrying out the invention each length of casing pipe is provided at the factory with a circumferential layer of weld metal 6 at a predetermined distance from the end of the pipe section so as to locate the layer at approximately the point of former weakness in the joint. This layer of weld metal 6 is deposited while the pipe is in a horizontal position and preferably in a manner providing a substantially wide shallow band of deposit with no danger of undercutting at the edges.

When the weld is completed at the well with the casing in vertical position the last two layers 7 of weld deposit fuse with the metal of the layer 6 instead of directly with the metal of the casing part 4. The effect of this procedure is to anneal the metal of casing 4 adjacent the layer 6 and to refine the metal of layer 6, thereby greatly improving the physical characteristics of the joint. Furthermore, the sectional area of the joint at the upper edge of the field weld is greater than the section of the casing 4, by reason of the layer 6 and there is a more gradual change in section resulting in less tendency for concentration of stress.

The invention may have various embodiments within the scope of the accompanying claims.

I claim:

1. The method of welding a slip joint in casing pipe comprising providing a circumferential bead on the spigot end of one length of casing positioned to coincide with the upper edge of the finished weld, inserting the end of said casing vertically downward into a slip sleeve on the upper end of the string of casing in a well, said circumferential bead being of considerably less thickness than the thickness of said slip sleeve, and applying an electric arc with a fusible metallic electrode to deposit a plurality of layers of weld metal circumferentially of the casing, the lower portion of said deposit being fused with the metal of the upper edge of said sleeve for the full thickness of the sleeve and with the metal of the vertical wall of said casing pipe for a substantial heighth and the upper portion of the deposit being fused with the lower portion thereof and with the lateral surface of the said bead, and said circumferential bead providing added thickness for the casing pipe at the upper surface of said deposit to prevent undercutting of the casing pipe by the arc.

2. The method of welding a slip joint in casing pipe comprising depositing a layer of weld metal circumferentially of the spigot end of one length of casing while the latter is in a substantially horizontal position, said layer being positioned to coincide with the upper edge of the finished weld, inserting the end of said casing vertically downward into a slip sleeve on the upper end of the string of casing in a well, and applying an electric arc with a fusible metallic electrode to deposit a plurality of layers of weld metal circumferentially of the casing and fusing the deposited metal with the metal of the upper edge of said sleeve and the metal of the vertical wall of said casing pipe, the upper layer of said weld being fused with the metal of said first-mentioned circumferential layer deposit.

3. A slip-sleeve-welded-casing joint, comprising a sleeve member attached to the upper end of a string of casing in a well, a length of casing pipe having one end inserted downwardly in said sleeve and having a thickened portion positioned a predetermined distance above the upper edge of said sleeve and extending outwardly from the wall of said casing pipe for a considerably less distance than the thickness of said sleeve, and a plurality of layers of weld metal deposited on the upper edge of said sleeve, said weld deposit being fused with the metal of the upper edge of said sleeve for the full thickness of the sleeve and with the metal of the vertical wall of said casing pipe for a substantial heighth, the upper portion of the deposit being fused with the lower portion thereof and with a lateral surface of said thickened portion, and said thickened portion providing added thickness for the casing at the surface of the deposit.

LOUIS J. LARSON.